(12) United States Patent
Musuvathi et al.

(10) Patent No.: US 9,063,778 B2
(45) Date of Patent: Jun. 23, 2015

(54) FAIR STATELESS MODEL CHECKING

(75) Inventors: Madanlal Musuvathi, Redmond, WA (US); Shaz Qadeer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1711 days.

(21) Appl. No.: 11/971,656

(22) Filed: Jan. 9, 2008

(65) Prior Publication Data

US 2009/0178044 A1 Jul. 9, 2009

(51) Int. Cl.
*G06F 9/46* (2006.01)
*G06F 9/48* (2006.01)

(52) U.S. Cl.
CPC ........ *G06F 9/4881* (2013.01); *G06F 2209/484* (2013.01)

(58) Field of Classification Search
None
See application file for complete search history.

(56) References Cited

U.S. PATENT DOCUMENTS

| | | | |
|---|---|---|---|
| 5,615,137 A | 3/1997 | Holzmann et al. | |
| 6,085,215 A * | 7/2000 | Ramakrishnan et al. | 718/102 |
| 6,295,515 B1 | 9/2001 | Kurshan et al. | |
| 6,324,496 B1 | 11/2001 | Alur et al. | |
| 7,111,296 B2 * | 9/2006 | Wolrich et al. | 718/102 |
| 7,496,918 B1 * | 2/2009 | Dice et al. | 718/100 |
| 7,707,578 B1 * | 4/2010 | Zedlewski et al. | 718/102 |
| 2002/0002667 A1 * | 1/2002 | Kelsey et al. | 712/228 |
| 2003/0037228 A1 * | 2/2003 | Kelsey et al. | 712/245 |
| 2003/0167421 A1 * | 9/2003 | Klemm | 714/37 |
| 2003/0200255 A1 * | 10/2003 | Vallone | 709/203 |
| 2004/0210900 A1 * | 10/2004 | Jones et al. | 718/100 |
| 2004/0215933 A1 * | 10/2004 | Nguyen et al. | 712/200 |
| 2005/0015672 A1 * | 1/2005 | Yamada | 714/38 |
| 2006/0059487 A1 * | 3/2006 | Chatterjee et al. | 718/100 |
| 2006/0112391 A1 * | 5/2006 | Hernandez | 718/102 |
| 2006/0130010 A1 | 6/2006 | Rehof et al. | |
| 2006/0136919 A1 * | 6/2006 | Aingaran et al. | 718/100 |
| 2006/0156306 A1 * | 7/2006 | Di Gregorio et al. | 718/102 |
| 2006/0218534 A1 * | 9/2006 | Kahlon et al. | 717/124 |
| 2006/0230408 A1 * | 10/2006 | Frigo et al. | 718/108 |
| 2006/0236322 A1 * | 10/2006 | Brackman | 718/103 |
| 2006/0247907 A1 | 11/2006 | Qadeer et al. | |
| 2007/0055977 A1 * | 3/2007 | Becker et al. | 719/330 |
| 2007/0074210 A1 * | 3/2007 | Cohen | 718/100 |

(Continued)

OTHER PUBLICATIONS

Elmas, et al., "VyrdMC: Driving Runtime Refinement Checking with Model Checkers", Electronic Notes in Theorectical Computer Science, vol. 144, Issue 4, May 2006, Proceedings of 5th Workshop on Runtime Verification (RV 2005), found at <<http://react.cs.uni-sb.de/rv2005/proceedings/3.pdf>>, 15 pgs.

(Continued)

*Primary Examiner* — Charles Swift
(74) *Attorney, Agent, or Firm* — Stephen A. Wight; Judy Yee; Micky Minhas

(57) ABSTRACT

Techniques for providing a fair stateless model checker are disclosed. In some aspects, a schedule is generated to allocate resources for threads of a multi-thread program in lieu of having an operating system allocate resources for the threads. The generated schedule is both fair and exhaustive. In an embodiment, a priority graph may be implemented to reschedule a thread when a different thread is determined not to be making progress. A model checker may then implement one of the generated schedules in the program in order to determine if a bug or a livelock occurs during the particular execution of the program. An output by the model checker may facilitate identifying bugs and/or livelocks, or authenticate a program as operating correctly.

20 Claims, 8 Drawing Sheets

(56) References Cited

U.S. PATENT DOCUMENTS

| | | | |
|---|---|---|---|
| 2007/0143742 A1 | 6/2007 | Kahlon et al. | |
| 2008/0098207 A1* | 4/2008 | Reid et al. | 712/227 |
| 2008/0148274 A1* | 6/2008 | Accapadi et al. | 718/107 |
| 2008/0250422 A1* | 10/2008 | Lewis | 718/107 |
| 2008/0271041 A1* | 10/2008 | Sakai | 718/107 |
| 2009/0100432 A1* | 4/2009 | Holloway et al. | 718/103 |

OTHER PUBLICATIONS

Flanagan, "Verifying Commit-Atomicity using Model-Checking", Proceedings of 11th Intl SPIN Workshop on Model Checking Softwart (SPIN'04), 2004. found at <<http://spinroot.com/spin/Workshops/ws04/001-spin2004.pdf>>, 15 pgs.

Godefroid, "Model Checking for Programming Languages using VeriSoft", Proceedings of 24t ACM Symposium on Principles of Programming Languages, found at <<http://www.eecs.umich.edu/~bchandra/courses/papers/Godefroid_Verisoft.pdf>>, Jan. 1997, 14 pgs.

Musuvathi, et al., "Iterative Context Bounding for Systematic Testing of Multithreaded Programs", Conf on Programming Language Design and Implementation, Proceedings 2007 ACM SIGPLAN conf, 2007, found at <<http://research.microsoft.com/projects/CHESS/IterativeContextBounding.pdf>>, 9 pgs.

Tasiran et al, "Runtime Refinement Checking of Concurrent Data Structures", Proceedings 4th Workshop on Runtime Verification (RV 2004), Electronic Notes in Theorectical Computer Science, vol. 113, Jan. 2005, found at <<http://network.ku.edu.tr/~stasiran/publications/TasiranQadeerRV04.pdf>>, 16 pgs.

* cited by examiner

600

```
 1  init.P := {};
 2  ∀u ∈ Tid : init.E(u) := {};
 3  ∀u ∈ Tid . init.D(u) := Tid;
 4  ∀u ∈ Tid : init.S(u) := Tid;
 5  curr := init;
 6  while true do
 7      T := curr.ES \ pre( curr.P, curr.ES);
 8      if T={} then
 9          return;
10      end
11      t := Choose(T);
12      next := NextState(curr, t);
13      next.P := curr.P \ (Tid × {t});
14      foreach u ∈ Tid do
15          next.E(u) := curr.E(u) ∩ next.ES;
16          if u = t then
17              next.D(u) :=
                    curr.D(u) ∪ (curr.ES \ next.ES);
18          else
19              next.D (u) := curr.D (u) ;
20          end
21          next.S(u) := curr.S(u) ∪ {t};
22      end
23      if curr. yield (t) then
24          H := (next.E(t) ∪ next.D(t)) \ next.S(t);
25          next.P := next.P ∪ ({t} × H);
26          next.E(t) := next.ES;
27          next.D(t) := {};
28          next.S(t) := {};
29      end
30      curr := next;
31  end
```

*Fig. 6*

FAIR STATELESS MODEL CHECKING

BACKGROUND

Analyzing and debugging complex programs using a technique called model checking, is an important process to ensure that a program meets its design goals during and after development thereof. However, a sophisticated program can be challenging to analyze, particularly when the program includes multiple threads which are run in cyclic state spaces.

Multi-thread programs are characterized by including two or more threads which, when executed by an operating system, require processor resource allocation by the operating system. For example, a program may include two threads (t, u). During an execution of the program, thread t may be executed during a first resource allocation, and thread u may be executed during a second resources allocation and so forth, such that the resource allocation may look like: t, u, t, u, u, t, u, . . . t. Unlike acyclic programs, multi-thread cyclic programs may include an indefinite number of resource allocation sequences, thus making it impossible to test each combination of thread executions.

Prior attempts to analyze computer programs include tracking the state of a modified program to determine interactions at each state. More recently, stateless model checking has introduced a type of model checking whereby the model checker explores the state space of the program without capturing the individual program states. The program is executed under the control of a special scheduler that controls all non-determinism in the program. However, prior art stateless model checking only applies to terminating programs which have acyclic state spaces.

Another stateless approach uses a predetermined and arbitrary bound depth to artificially terminate a non-terminating program, thus making it act like a terminating program. This is disadvantageous because it reduces the coverage of a safety verification, thus may not explore a cycle deep enough to uncover improper or undesirable program execution. Conversely, increasing the depth bound increases the inefficiency of a search by exponentially adding more resources to unroll cycles in the state space rather than explore new state spaces.

SUMMARY

This summary is provided to introduce simplified concepts of fair stateless model checking, which is further described below in the Detailed Description. This summary is not intended to identify essential features of the claimed subject matter, nor is it intended for use in determining the scope of the claimed subject matter.

Exemplary techniques for providing a fair stateless model checker are disclosed. According to one or more embodiments, a schedule is generated to allocate resources for threads of a multi-thread program in lieu of having an operating system allocate resources for the threads. The generated schedule is configured to be both fair and exhaustive. In an embodiment, a priority graph may be implemented to reschedule a thread when a different thread is determined not to be making progress. A model checker may implement one of the generated schedules in the program in order to determine if a bug or a livelock occurs during the particular execution of the program. In at least one other embodiment, an output by the model checker may facilitate identifying bugs and/or livelocks, or authenticate a program as operating correctly.

BRIEF DESCRIPTION OF THE DRAWINGS

The detailed description is described with reference to the accompanying figures. In the figures, the left-most digit(s) of a reference number identifies the figure in which the reference number first appears. The same reference number in different figures refers to similar or identical items.

FIG. 6 shows an illustrative algorithm listing of at least one embodiment of a fair stateless model checker.

DETAILED DESCRIPTION

Generally speaking, stateless model checking provides a well suited technique for analyzing large programs, particularly programs including global variables, heap, thread stacks, and register contexts, among other characteristics which make capturing each program state impractical. Stateless model checking is a useful technique for systematically testing complex real-world software. Multi-thread non-terminating programs present a particular problem for prior art model checking techniques because they include cyclic state spaces, such as spin loops which result in infinite executions.

Exemplary Environment

Figure 1:
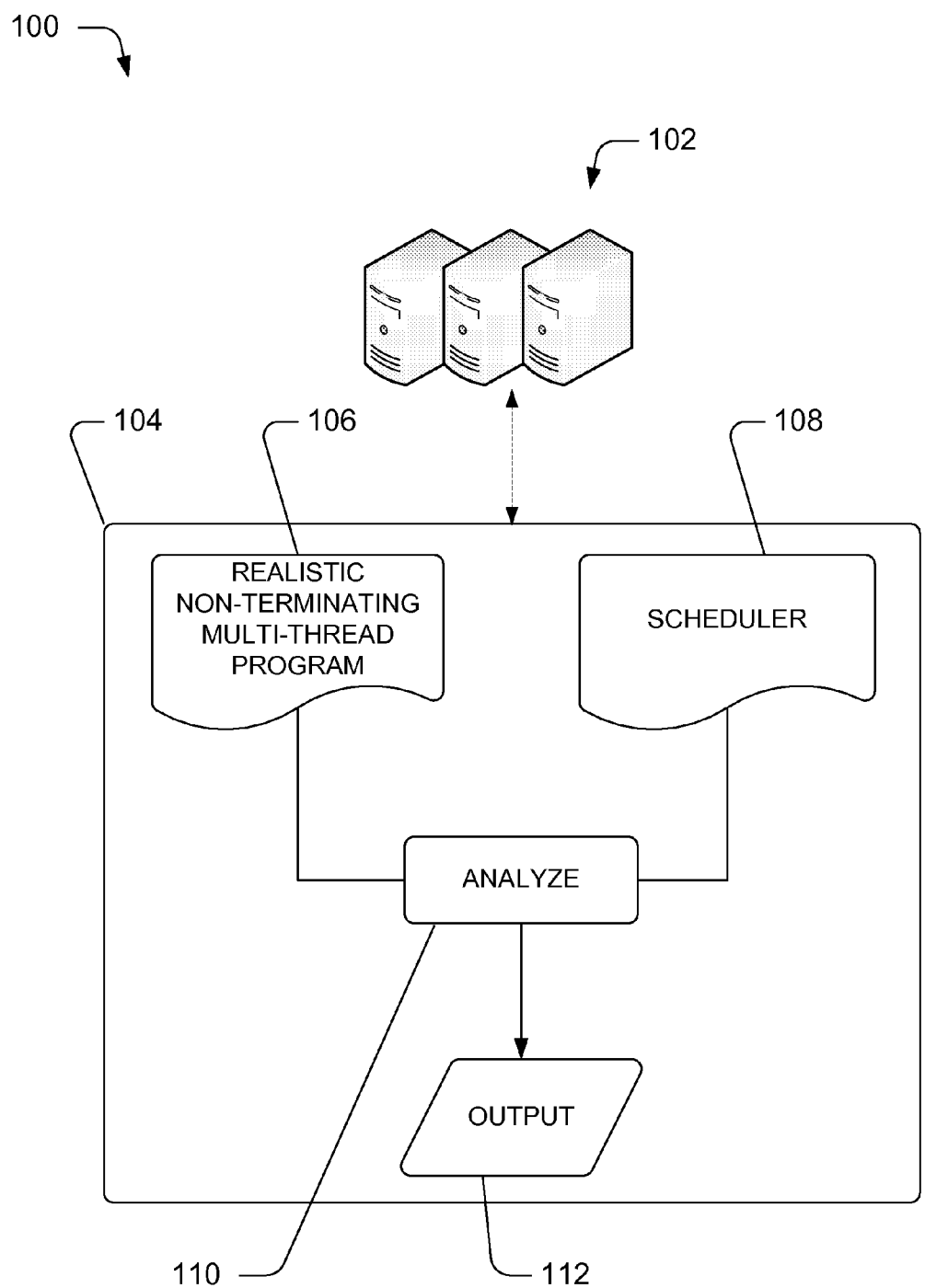
FIG. 1 shows an illustrative environment in which at least one embodiment of fair stateless model checking may be implemented, including an illustrative process of analyzing a multi-thread program.

FIG. 1 shows an illustrative environment 100 in which one or more embodiments of fair stateless model checking may be implemented, including an illustrative process of analyzing a multi-thread program. The environment 100 includes one or more computing devices 102 which are operable to process application code 104. In some instances, the application code 104 may include compiled code while in other instances, some or all of the application code 104 may be non-compiled (i.e., source code).

In an embodiment, the application code 104 includes a program 106 and a scheduler 108. The program 106 may be a real-world program that is not modified prior to model checking. The program 106 may be computer software, such as and without limitation a utility program, a multimedia program, a game, etc. In an embodiment, the program 106 may be tested by the fair stateless model checker just prior to, or after, completion of a development process. For example, the program 106 may be a compiled program that has been generated from an initial software development cycle. The program 106 includes a multi-thread structure that is non-terminating, which creates a cyclic state model of the program.

As shown in FIG. 1, the scheduler 108 may generate schedules which may be used with the program 106. Typically, when the program 106 is executed by a computer device, the operating system (OS) determines the scheduling of threads in the program based on a priority and the availability of resources. In such instances, model checking becomes difficult if not impossible because the OS may not schedule a wide array of the possible schedules for the threads used by the program. Instead of relying on the OS to schedule the threads, the scheduler 108 acts to artificially simulate the scheduling of threads by the OS, thus providing control of the thread schedules by the model checker. In an illustrative example, the scheduler 108 creates a plurality of schedules, which when implemented with the program 106, explore the majority of state spaces of the program.

In an embodiment, the scheduler 108 may create a schedule that includes an ordered list of thread execution events. Alternatively, the scheduler 108 may schedule one thread at a time, and then analyze the outcome of a portion of the program run (e.g., the execution of the scheduled thread) before scheduling another thread. Therefore, the schedule may include a feedback loop that facilitates providing the scheduler 108 with feedback on the thread activity during a program run.

In an embodiment, an analyzer 110 may be implemented to analyze the program 106 which is controlled by the thread schedules generated by the scheduler 108. Thus, the analyzer 108 acts as a model checker that executes the program 106 with each schedule generated by the scheduler 108 to analyze the program's response to each different schedule. The analyzer may detect bugs (e.g., execution errors, safety violations, etc.), livelocks (e.g., non-termination errors), or the completion of an anticipated program termination (APT). The analyzer may output results from the analysis to an output 112, such as a file or a display. The output may indicate locations and/or occurrences of bugs and/or livelocks or it may indicate the completion of an anticipated program termination, such as by issuing an approval certificate.

Illustrative Implementation

Figure 2:
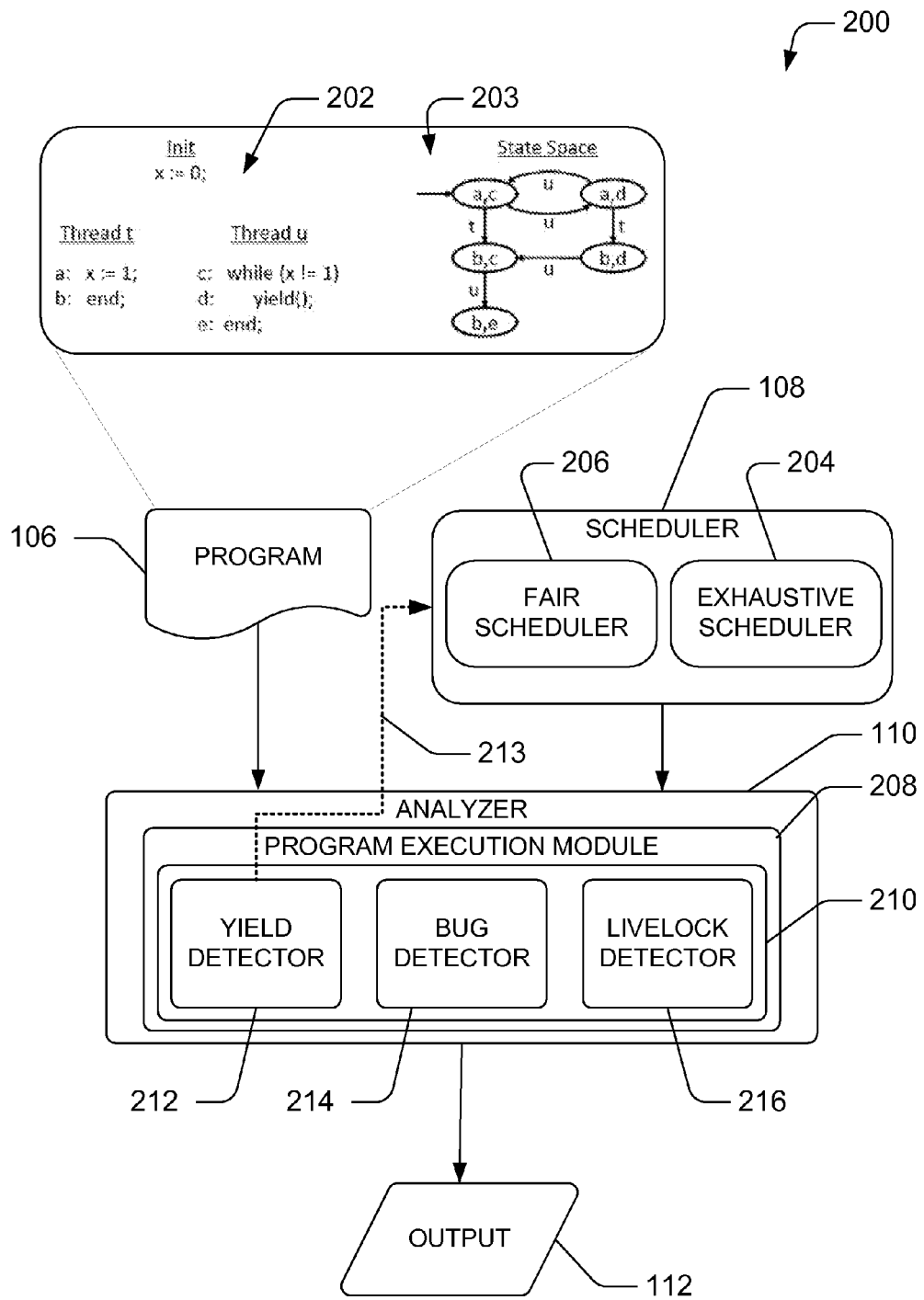
FIG. 2 shows an illustrative flow diagram of at least one embodiment of fair stateless model checking. The program is an example of a non-terminating program with two simple threads.

FIG. 2 shows an illustrative flow diagram 200 in accordance with at least one embodiment of fair stateless model checking. For discussion purposes and without limitation, the program 106 from FIG. 1 is presented as an illustrative two-thread simple program 202.

As an example, simple program 202 includes a first thread t and a second thread u, which manipulate a global variable x. During operation of the simple program 202, the first thread t sets x to 1, while the second thread u spins in a loop waiting for the update of x by t. A state space diagram 203 depicts the state space of the two-thread program 202. The state of the simple program 202 can be captured by a program counter of the two threads. For instance, the state (a,c) is the initial state at which the two threads are about to execute the instructions at locations a and c respectively. The state space contains a cycle between (a,c) and (a,d), resulting from the spin loop of u. As shown, this program does not terminate under the schedule that continuously runs u without giving a chance for t to execute, thus making it a non-terminating program.

Although the two-thread program is non-terminating, it will terminate when executed with a fair schedule, thus making the simple program 202 a "fairly terminating" program. A fair schedule shares resources among the various threads for the program 106. Conversely, an unfair schedule staves a particular thread by dedicating all resources to other threads, thus not executing the particular thread. Typically, operating systems allocate resources to each thread using a fair schedule, thus selectively alternating between the various threads in a multi-thread program so each thread has a chance to execute. Often, the OS determines which thread is selected based on a priority, such as an integer priority value, for each thread.

Concurrent programs are tested by combining them with a suitable test harness to make them fairly terminating. A fair scheduler eventually gives a chance to every thread in the program to make progress ensuring that the program as a whole makes progress towards the end of the test. Such a test harness can be created even for systems such as cache-coherence protocols that are designed to "run forever." The harness limits the number of cache requests from the external environment. The notion of fair termination includes an expectation of a program, such as the simple program 202, to terminate when run on a real machine.

When a thread waits for a resource that is not available, it either blocks on the resource or yields the processor. A block or a yield tells the operating system scheduler to perform a context switch to another thread, such as the thread holding the resource required by the waiting thread. If the waiting thread does not yield the processor and continues to spin idly, it will needlessly waste its time slice of a processor and slow down the program. This behavior is consequently considered an error. Therefore, in addition to being fairly-terminating, correct programs also satisfy the following property: if a thread is scheduled infinitely often, then it yields infinitely often. The simple program 202 satisfies this property because there is a yield statement in the spin loop of thread u. Also, a thread that terminates after executing a finite number of steps satisfies the property.

The scheduler 108, as described in FIG. 1, may include an exhaustive scheduler 204 and a fair scheduler 206. An exhaustive scheduler provides all possible schedule scenarios, thus making it "exhaustive" in the literal sense. It follows that an exhaustive schedule for the simple program 202 will result in an infinite number of schedules. The exhaustive scheduler is nondeterministic to guarantee full coverage of safety properties of a program.

With an exhaustive schedule, the program 106 is executed under the control of a scheduler, such as scheduler 108 that controls all the non-determinism in the program, thus assuming responsibilities that are typically controlled by the OS. The exhaustive scheduler 204 systematically enumerates all execution paths of the program obtained by the nondeterministic choices.

In at least one other embodiment, the fair scheduler 206 schedules a new thread when the exhaustive scheduler 204 tries to schedule a yielding thread. In other words, when the fair scheduler 206 is signaled (such as by a feedback loop) that a thread is not making progress, the fair scheduler will stop scheduling the yielding (or otherwise non-progressive thread) and divert resources to a different thread, such as a thread that will enable the yielded thread to make progress. Implementation of a fair schedule may exponentially increase the speed of error checking by a model checker because resources are not wasted by scheduling threads that cannot make progress.

As shown in FIG. 2, the scheduler 108 includes the exhaustive scheduler 204 and the fair scheduler 206. Although the exhaustive scheduler 204 and the fair scheduler 206 are depicted separately, other implementations may include combining them into a single scheduler module. Taken together, the scheduler 108 therefore produces an exhaustive and fair schedule. Thus, as long as the program 106 is fairly terminating, the scheduler 108 will not generate an infinite number of schedules (truly exhaustive) because the scheduler includes fair scheduling, which will avoid generating schedules that produce a non-terminating program run. Instead, the fair scheduler 206 will guide the program to allocate resources to threads that are making progress, and thus enable the creation of a finite number of schedules.

The analyzer 110, as described in FIG. 1, includes a program execution module 208 and a number of detection modules 210. The program execution module 208 represents an execution of the program 106 within the analyzer 110, which is operable as a model checker. Concurrently during a run of the program by the program execution 208, the detection modules 210 may monitor the program execution 208 using a yield detector 212, a bug detector 214, and/or a livelock detector 216.

The yield detector 212 may detect when the program is not making progress, usually because a thread is waiting for another event to occur before the thread can make progress. Progress may be halted when, e.g., a thread calls a sleep function, a timeout occurs, or otherwise when a thread yields to other threads or an event that has not occurred. In at least one embodiment, the yield detector 212 may use term or keyword matching to identify when a yield is implanted in a thread. In addition, or alternatively, the yield detector 212 may perform an analysis of a yielding thread's execution to identify it as a yielding thread.

In at least one embodiment, the yield detector 212 provides a feedback loop 213 to the scheduler 108 to signal the scheduler that a thread is not making progress. Further, the feedback loop 213 may provide a signal directly to the fair scheduler 206, which in turn may generate a fair schedule for the next thread allocation. In such an embodiment, the fair scheduler may dynamically update a schedule created by the scheduler 108.

The bug detector 214 detects the occurrence of a bug in the program execution 208. For example, a bug may be an execution error that prematurely terminates the program 106, such as by creating a safety violation. In the context of the model checker, a bug includes concurrency-related errors.

The livelock detector 216 detects a livelock. A livelock exists when the program is not making progress despite a fair schedule which is generated by the fair scheduler 208.

In at least one embodiment, the livelock detector 216 may detect a livelock by setting a bound depth for a program. In practice, it is not possible for a stateless model checker to identify or generate an infinite execution. Therefore, the user may set an arbitrary large bound on the execution depth which can be used to detect a livelock. This bound can be many orders of magnitude greater than the maximum number of steps the user expects the program to execute. The model checker stops if an execution exceeding the bound is reached and reports a warning to the user. This execution is then examined by the user to see if it actually indicates a livelock. If not, the user simply increases the bound and runs the model checker again. Thus livelock detector 206 is able to detect the livelock in the program.

Generally speaking, the analyzer 110, acting as a model checker for the program 106, may facilitate the program execution 208 using a schedule from the scheduler 108. The program execution 208 may be monitored by the detection modules 210, including the yield detector 212, the bug detector, 214, and the livelock detector 216. The program execution may result in a detection of a livelock, a bug, or an anticipated program termination, which may complete a cycle of a unique schedule. Additional schedules may be generated by the exhaustive scheduler 204 until all possible schedules have been exhausted, while only fair schedules are generated by the fair scheduler 206, and thus provided by the scheduler 108 for implementation with the analyzer 110. Finally, the analyzer 110 may generate information for the model checker in the output 112.

Figure 3:
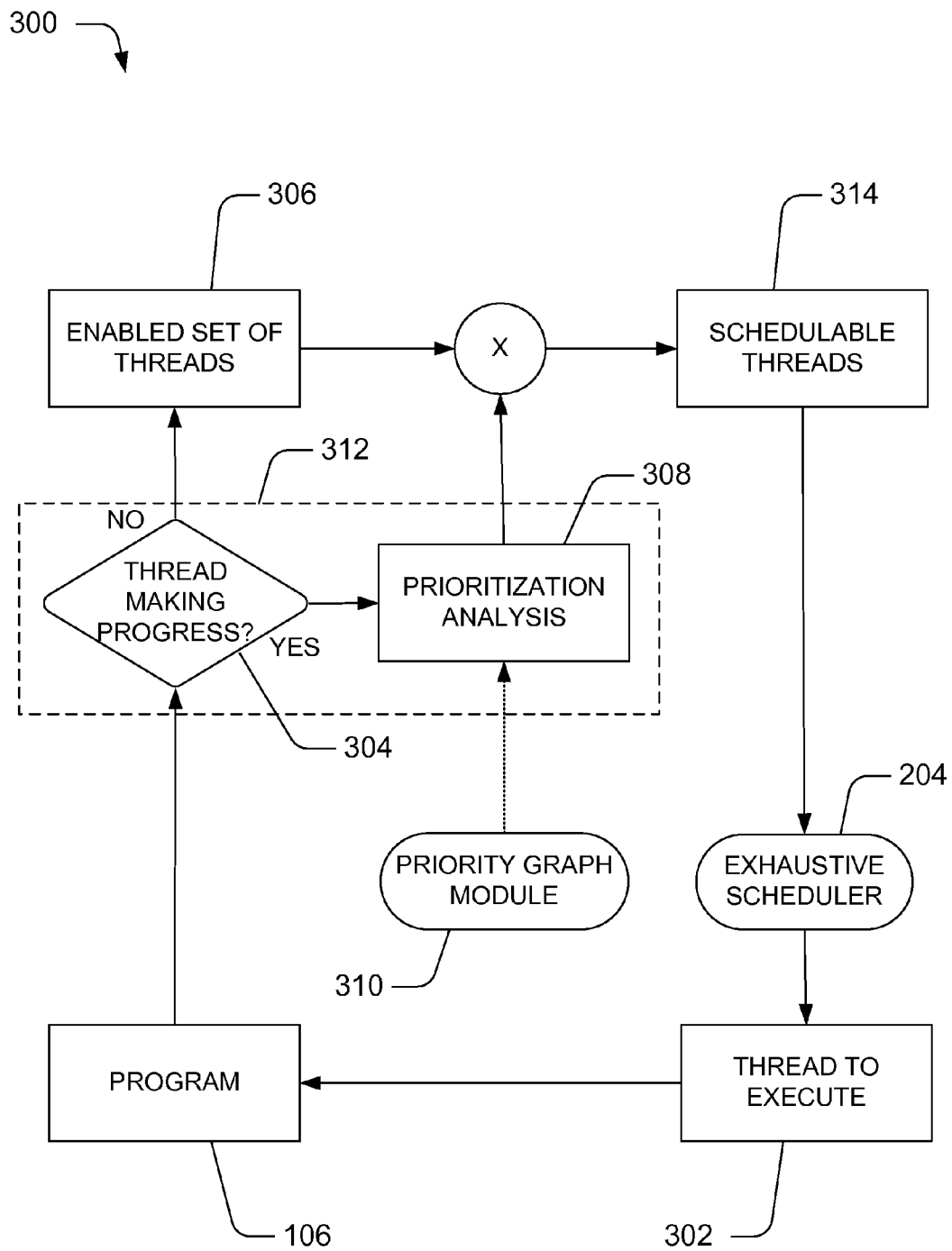
FIG. 3 shows an illustrative processing flow of at least one embodiment of a fair stateless model checker including a priority graph for prioritizing the execution of threads.

FIG. 3 shows an illustrative processing flow 300 in accordance with at least one embodiment of a fair stateless model checker including a priority graph for prioritizing the execution of threads. The process flow 300 uses the exhaustive scheduler 204 as described with reference to FIG. 2, to determine the schedule for the threads to execute in a program at 302. The threads are then analyzed with the program 106.

Next, an analysis of a scheduled thread may be conducted to determine if the thread is making progress at a decision block at 304. A determination that the thread is not making progress may be established if the thread is yielding to another thread, such as in a spin cycle, the thread causes a timeout to occur, the thread calls a sleep function, or any other indication that the thread is not making progress. If the thread is making progress, indicated by the absence of progress-inhibiting operations, the processing flow 300 at 306 may enable the thread for execution in the program.

However, if the thread is not making progress at the decision block at 304, then the process advances to a prioritization analysis at 308. The prioritization may be performed by a priority graph module 310. The priority graph module 310 may include information to determine the priority of the threads. For example, the priority graph module 310 may include a priority graph, such as a look up table, database, or other data source that contains information on the priority of threads used by the program 106. Each thread may be assigned a relative or absolute priority by the priority graph module 310, which determines when the thread should be called with respect to other threads. For example, a thread with a higher priority would be called before a thread with a lower priority, assuming that neither of the threads was previously active. When a particular thread is not making progress, the priority graph 308 may select another thread or selection of threads which should be scheduled to run, thus modifying the schedule to avoid executing a non-productive thread.

An illustrative priority graph implemented with the priority graph module 310 may be a relative prioritization that includes three threads (u, t, g). The relative priority of the threads may be expressed as {u>t>g>w}. For example, when thread t has yielded, the priority graph will determine that thread u should be schedule over thread g and thread w because thread u has a higher priority. Thread t is not scheduled because it has yielded and is not making progress. In other implementations, the priority graph may include absolute priority values, such as integer priorities. In one or more embodiments, the priority graph may include multiple priorities which include different relationships between the threads. For example, a priority graph may include {u>t>g}, {t>w}, thus the relative priority of w with respect to g is undetermined. In some embodiments, it may be advantageous to define the priority of threads by relative relationships.

In some embodiments, the priority graph used by the priority graph module 310 may be updated to include a partial order on the set of threads in each state. This partial order defines a scheduling priority over threads in each state. An enabled thread cannot be scheduled in a state if a higher priority thread, as determined by the partial order, is enabled in that state. By appropriately updating such a priority order, the fair stateless model checker generates only fair schedules. The scheduler introduces an edge in the priority order only when a thread yields, as identified by the yield detector 212, and thereby indicates lack of progress. Thus, the prioritization analysis at 308, in conjunction with the decision block at 304, operates as a fair scheduler 312. For example, a non-productive thread may be scheduled by the exhaustive scheduler 204 but overridden by the prioritization analyzer at 308, as determined by the priority graph module 310, when the scheduled thread is determined to not be making progress at the decision block at 306.

The processing flow resumes from either 306 or the prioritization analysis at 308 at a block 314 which depicts schedulable threads. At 314, the threads may be executed to advance the program 106.

Illustrative Operation

Figure 4:
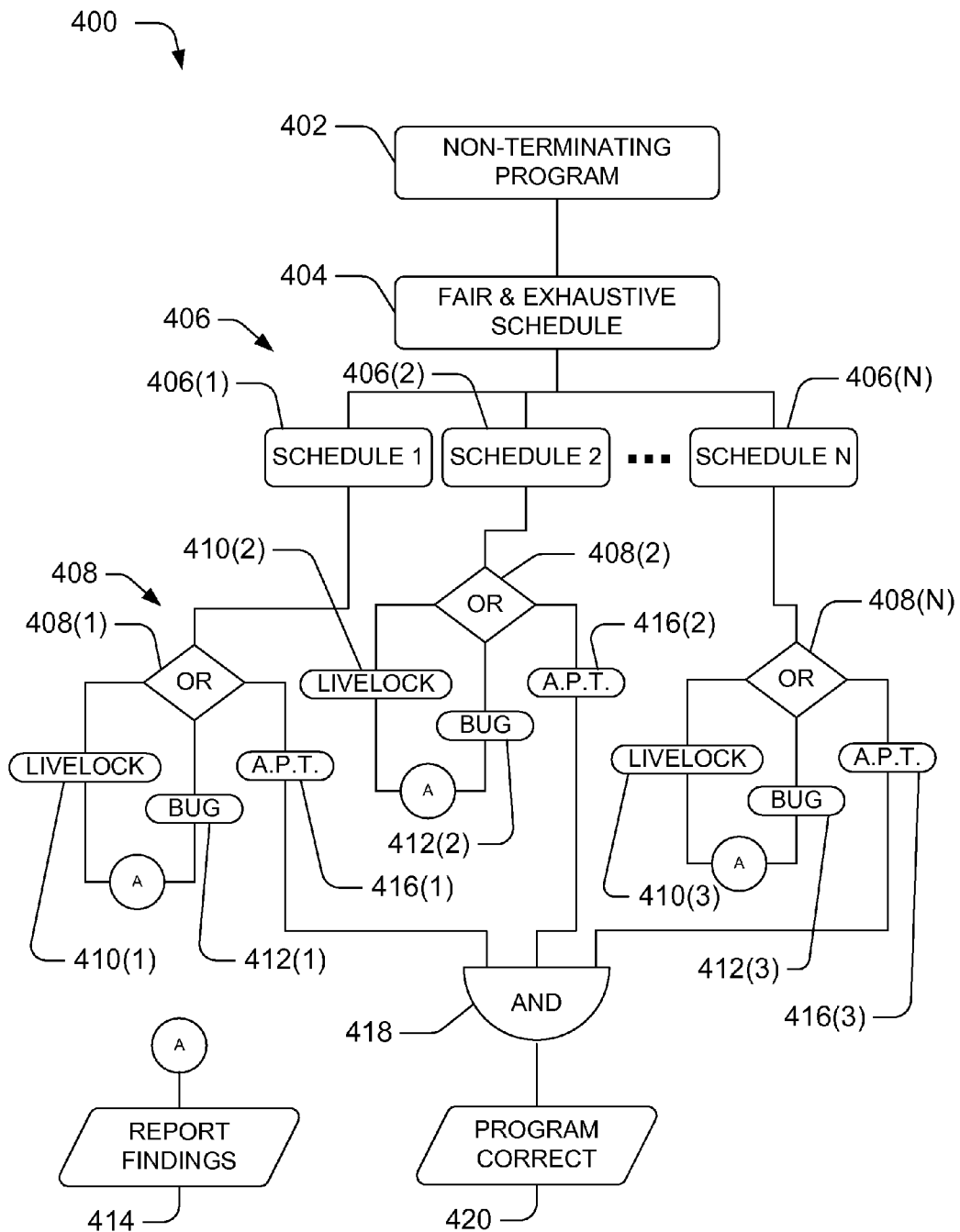
FIG. 4 shows another illustrative process flow of at least one embodiment of a fair stateless model checker including a plurality of schedules.

FIG. 4 shows another illustrative process flow 400 in accordance with one or more embodiments of a fair stateless model checker including a plurality of schedules. The process flow 400 includes a non-terminating program at 402. In embodiments, the non-terminating program is a realistic program that includes multiple threads. The non-terminating program is subjected to a fair and exhaustive schedule at 404. The fair and exhaustive scheduler 108 creates a number of schedules at 406, which are both fair and exhaustive. For example, the scheduler may create schedules 406(1), 406(2), . . . , 406(N). In at least one embodiment, the fair and exhaustive schedule may be generated using the priority graph 308 as illustrated in FIG. 3.

Each of the schedules 406(1)-(N) may be implemented with the non-terminating program during a model checking process, such as a model checking process implemented by the analyzer 110. Each schedule determines the order of the thread executions for each thread in the non-terminating program. A complete schedule includes the thread executions for all threads during a full execution of the program. Each schedule is unique, thus maximizing resources allocation during the model checking process while minimizing redundancy.

At a decision point 408, a number of possible outcomes may occur when the non-terminating program is subjected to the schedules, such as schedule 406(1). The program may enter a livelock at 410 or a bug may be detected at 412. A livelock is an instance when the program is executing properly, but the program is unable to make progress (as opposed to a thread that is unable to make progress, as described in relation to the decision block 304 in FIG. 3). For example, a program that enters multiple concurrent spin loops may enter a livelock when each spin loop is waiting for the other spin loop to complete. A bug is an error in program code which results in a premature program termination. For example, a bug may be an improper call to a function by a thread which terminates the program because of a safety violation.

If a livelock is detected at 410 or a bug is detected at 412, the process flow 400 progresses to report the finding at 414. In at least one embodiment, the model checker may store the schedule that results in a livelock and/or bug, thus assisting a user to error check the program, such as by retracing the state space of the program during the unsuccessfully executed schedule.

Alternatively, the program may execute until it achieves an anticipated program termination (APT) at 416. The APT occurs when the program does not encounter a bug or a livelock. The APT may be reported at 418 to compile the APT information. As described herein, livelocks, bugs, and APTs are intended to be mutually exclusive, while fully encompassing any potential outcome experienced when the program that is subjected to a schedule, such as schedule 406(1).

Each schedule includes a decision point 408, such as 408(1), 408(2), . . . , 408(N). Accordingly, each decision point 408 may result in a livelock at 410(1), 410(2), . . . , 410(N), a bug at 412(1), 412(2), . . . , 412(N), or an APT at 416(1), 416(2), . . . , 416(N). In an instance when each of the schedules report successful executions at 418, the process flow may issue a certificate showing the program is correct at 420. For example, the certificate may be used to authenticate a program as having completed the model checking process.

Figure 5:
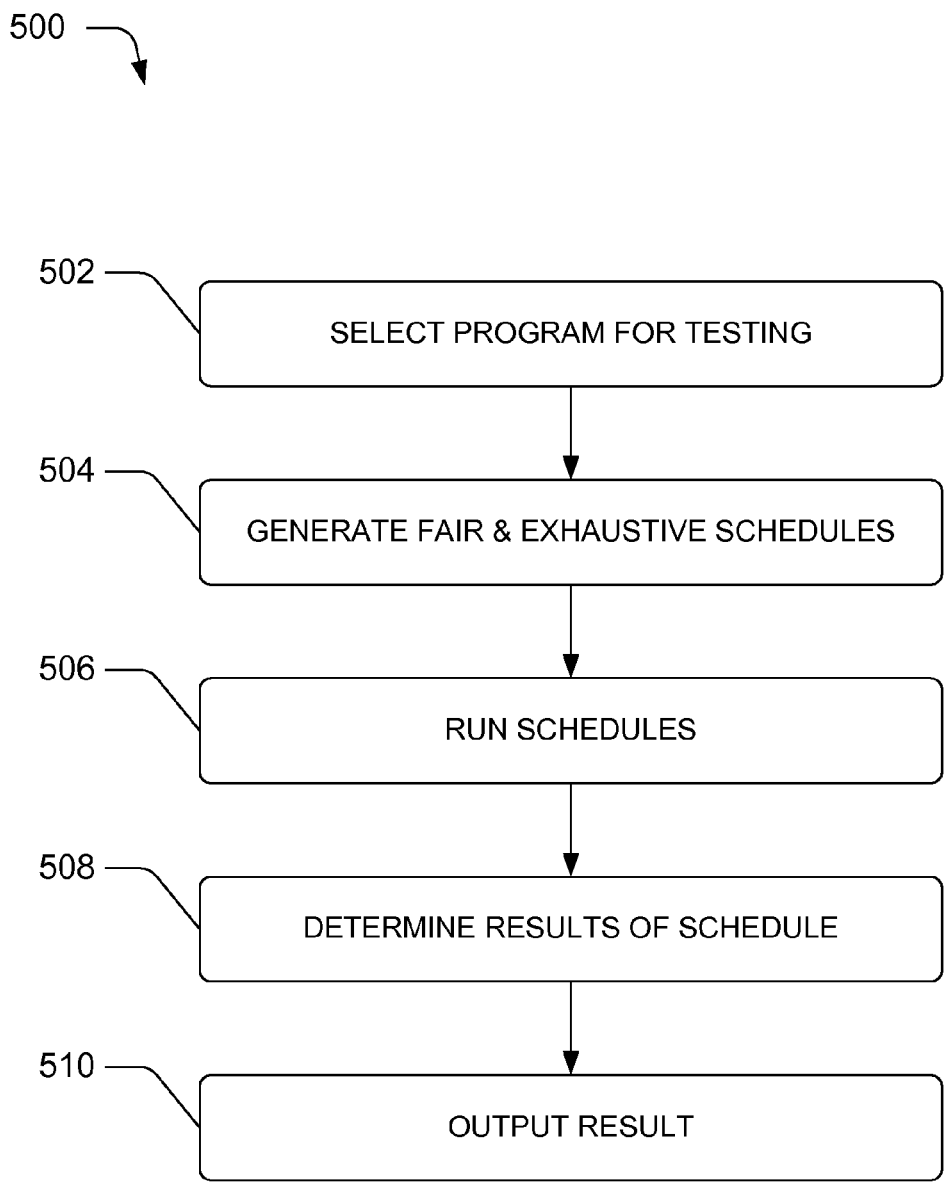
FIG. 5 shows a flow diagram of at least one embodiment of an illustrative process for providing fair stateless model checking for a program.

FIG. 5 shows a flow diagram of an illustrative process 500 in accordance with one or more embodiments of providing fair stateless model checking for a program. The process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 500 is described with reference to the architecture 200 of FIG. 2. In particular, many acts described below may be implemented and performed by the scheduler 108, and the analyzer 110.

The process 500 may begin by selecting a program to test at 502. As indicated, the program does not need to be modified before it is processed by the model checker. For example the program may be a piece of consumer software that has completed a first development cycle and is ready to be tested for bugs and livelocks. At 504, schedules may be generated for the program, which determine when the program's threads are executed. The schedule may be generated by the scheduler 108, which may generate fair and exhaustive schedules. In an implementation, the scheduler includes both a fair and exhaustive scheduler in a single module. Alternatively, the fair scheduler may be separate from the exhaustive scheduler, as shown in FIG. 3.

At 506, the program may be executed with each of the schedules. For example, a portion of a first unique schedule may be created by the scheduler 108. Cumulatively, the scheduler creates an exhaustive schedule of all possible fair schedules for the program. At 508 the result of each schedule implementation is determined as one of a livelock indication, a bug indication, or an anticipated program termination.

The results of all of the schedule runs for the program may be outputted at 510. For example, when the program is prematurely terminated by a bug, the program output at 510 may provide information such as, without limitation, the schedule that caused the bug, the point in the schedule where the bug occurred, etc. In an instance when no bugs or livelocks are detected for all the schedules, the output may issue a certificate which authenticates the program as successfully completing the model checking process.

Exemplary Algorithm

FIG. 6 shows an illustrative algorithm 600 listing of a fair stateless model checker. The illustrative algorithm 600 may be a nondeterministic fair scheduler. The illustrative algorithm 600 determines the available nondeterministic choices at each scheduling point during the execution of a program P, such as the program 106. In some embodiments, the description may be augmented with either a stack to perform depth-first search or a queue to perform breadth-first search.

The illustrative algorithm 600 includes an input of a multithreaded program P together with its initial state init. It assumes that the program P includes a function NextState that assumes a state s and a thread t and returns the state that result from executing t in state s. The illustrative algorithm starts with the initial state and an empty execution. In each iteration of the loop (lines 7-30), the algorithm may extend the current execution by one step. The illustrative algorithm may terminate with a complete terminating execution, when the return statement on line 9 is executed.

Each thread t ∈ Tid partitions an execution 6 into windows; a window of thread t lasts from a state immediately after a yielding transition by thread t to the state immediately after the next yielding transition by t. The algorithm maintains for each state s several auxiliary predicates that record information about a window of thread t.

1. S(t) maintains the set of threads that have been scheduled since the last yield by thread t.
2. E(t) maintains the set of threads that have been continuously enabled since the last yield by thread t.
3. D(t) maintains the set of threads that have been disabled by some transition of thread t since the last yield by thread t.

In addition to these predicates, each state s also contains a relation s.P which represents a priority ordering on threads. Specifically, if (t, u) ∈ s.P then t will be scheduled in s only when s.enabled(t) and s.enabled(u). In each iteration, the algorithm may first compute T (line 7), the set of schedulable threads that satisfy the priorities in curr.P. If T is empty, then the execution may terminate. Otherwise, the illustrative algorithm selects a thread t nondeterministically from T (line 11) and schedules t to obtain the next state. The model checker must explore the nondeterminism in the execution of Choose (T) on line 11. Systematic depth-first or breadth-first search capability may be added to the illustrative algorithm. At line 13, the illustrative algorithm may remove all edges with sink t from P to decrease the relative priority of t.

The loop at lines 14-22 updates the auxiliary predicates for each thread u ∈ Tid. The set E of continuously enabled threads is updated by taking the intersection of its current value with the set of enabled threads in next (line 15). The set D of threads disabled by thread t may be updated by taking the union of its current value with the set of threads disabled by the latest transition (line 17). The set of scheduled threads is updated on line 21.

Finally, if yield (t) holds in the new state then the data structures are updated appropriately to mark the beginning of a new window of u (line 23-29). The set H computed on line 24 may contain only those threads that were never scheduled in the current window of thread t and were either continuously enabled, or disabled by thread t at some point in the window. At line 25, the illustrative algorithm reduces the priority of t with respect to the threads in H.

Figure 7:
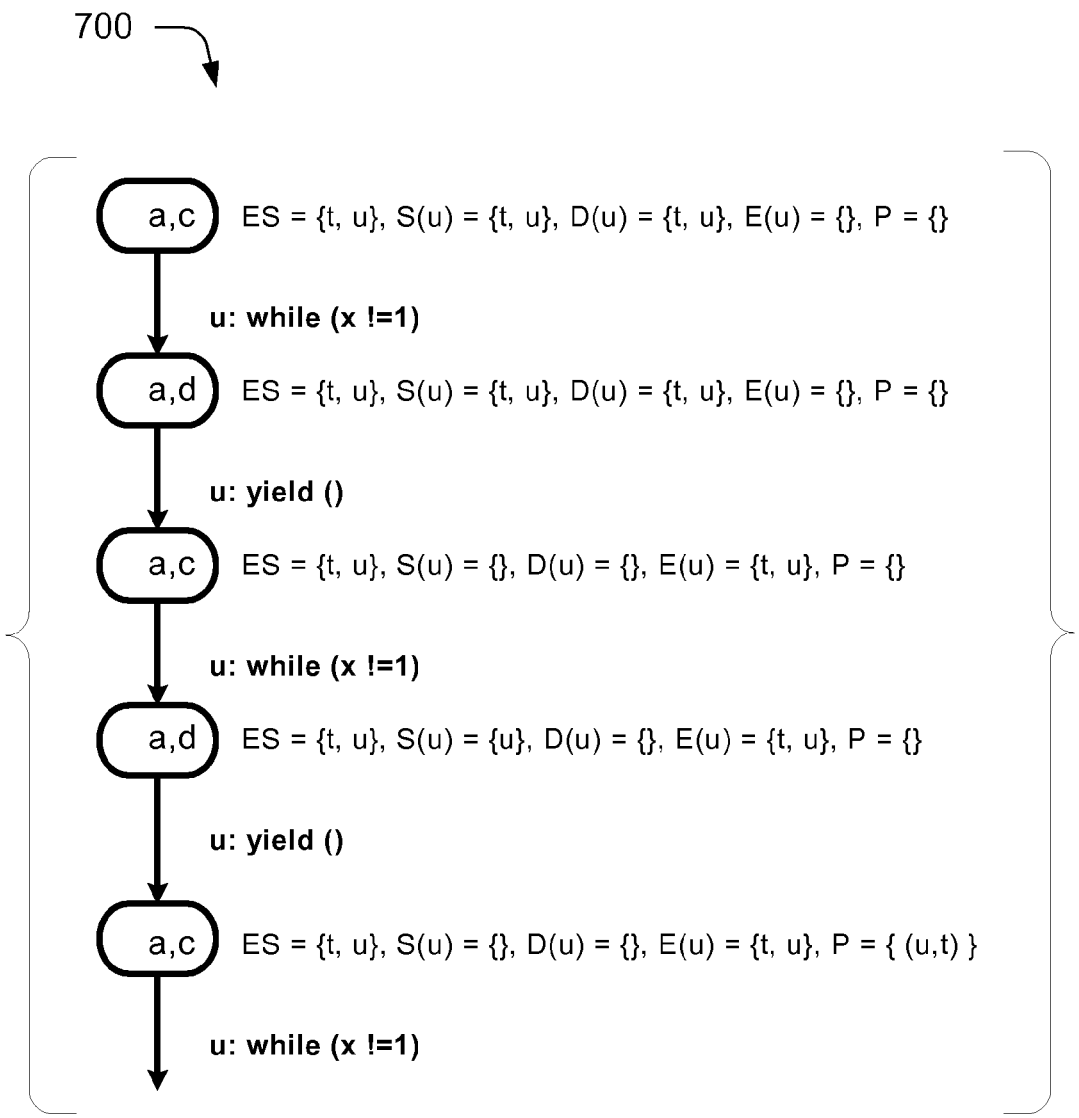
FIG. 7 is an illustrative state model for an implementation of the algorithm of FIG. 6 using the non-terminating program of FIG. 2.

FIG. 7 shows an emulation 700 of the illustrative algorithm 600 for the simple program 202 in FIG. 2. For conciseness, FIG. 7 only shows the emulation when the scheduler 108 attempts to schedule the thread u continuously. The emulation is focused on the values of the relation P and the predicates S(u), D(u), and E(u). The relation P is initialized to be empty. The predicates S(u), D(u) and E(u) are initialized in such a way that their values remain unchanged until the first yield of thread u. These values also provide the additional guarantee that the update of P at the first yield of any thread is guaranteed to leave the value of P unchanged. This behavior may ensure that the first window of any thread begins after its first yield at which point the predicates S(u), D(u) and E(u) get initialized appropriately.

In the emulation, the scheduler 108 executes thread u continuously. Starting from the initial state (a,c), the first window of u begins once the scheduler has scheduled u twice. At this point, u has gone through the spin loop once and the state is (a,c) again. In this state, P={ }, S(u)={ }, D(u)={ }, and E(u)=ES={t, u}. When u is executed for one more step, u is added to S(u) and the state becomes (a,d). In this state, yield (u) is true as u will yield if executed from this state. However, the P relation is still empty allowing the scheduler 108 to choose either of the two threads.

If the scheduler 108 chooses to schedule u again, the thread completes the second iteration of the loop and the program enters the state (a,c). Illustrative algorithm 600 adds the edge (u, t) to P because the set H on line 24 evaluates to {t}. Thus, the illustrative algorithm gives the yielding thread u a lower priority than the pending thread t. This update to P makes the set of scheduler choices T={t}. Thus, the scheduler 108 is forced to schedule t, which enables u to exit its loop.

Generalizing this example, if the thread t was not enabled in the state (a,c), for example, if it was waiting on a lock currently held by u, the scheduler 108 may continue to schedule u till it releases the lock. Further, if t was waiting on a lock held by some other thread v in the program 106, the illustrative algorithm 600 will guarantee that eventually v makes progress releasing the lock.

Exemplary System

Figure 8:
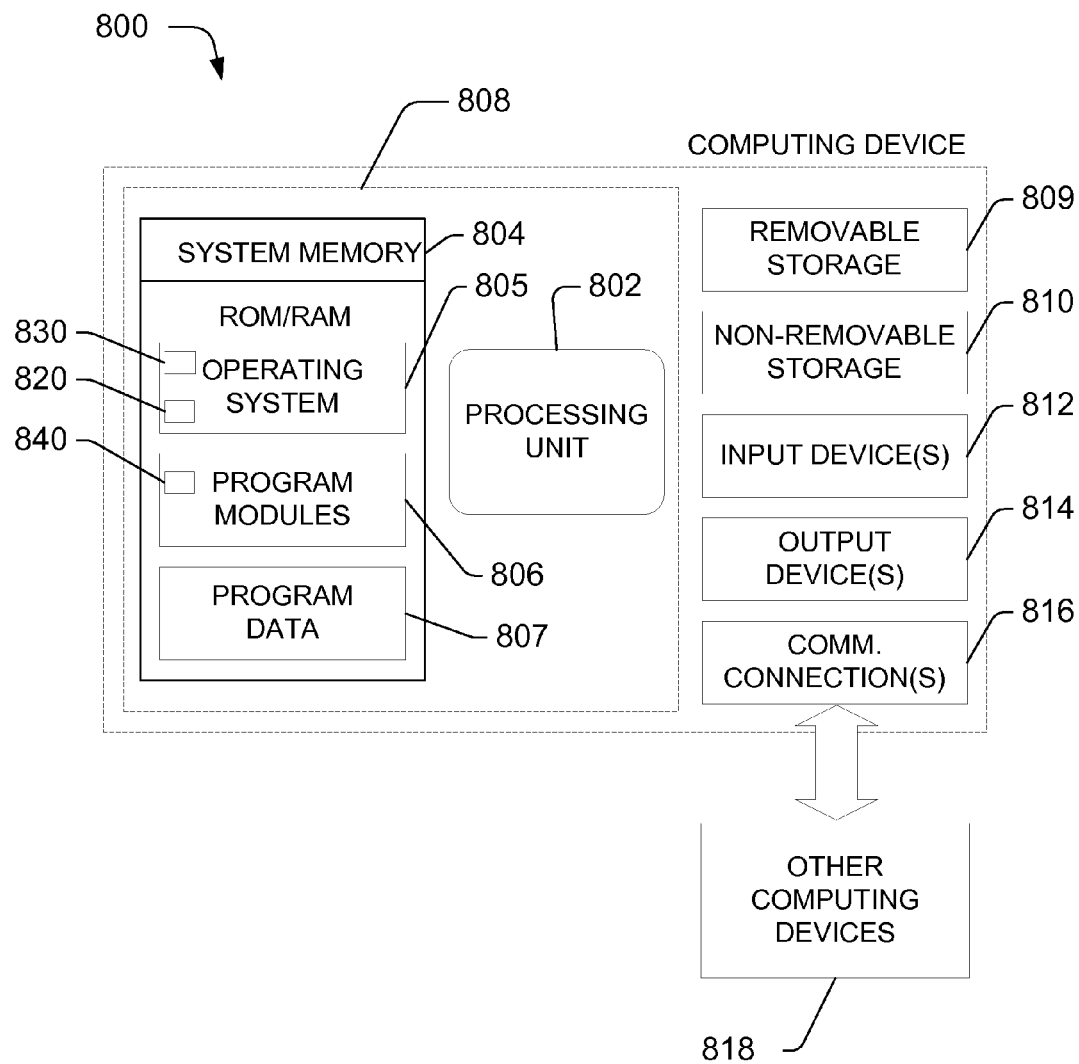
FIG. 8 is an illustrative computing device that may be used to implement the techniques and mechanisms described herein.

FIG. 8 illustrates one exemplary system for implementing the fair stateless model checking. The system includes a computing device, such as computing device 800. In a very basic configuration, computing device 800 typically includes at least one processing unit 802 and system memory 804. Depending on the exact configuration and type of computing device, system memory 804 may be volatile (such as RAM), non-volatile (such as ROM, flash memory, etc.) or some combination of the two. System memory 804 typically includes an operating system 805, one or more program modules 806, and may include program data 807. For one embodiment of the fair stateless model checker, the system memory 804 may also include a component-based framework 820 that supports components (including properties and events), objects, inheritance, polymorphism, reflection, and provides an object-oriented component-based application programming interface (API), such as, but not exclusive to, that of the .NET™ Framework manufactured by Microsoft Corporation, Redmond, Wash. For this embodiment, the system memory 804 may also include an administrative tool framework 830 that interacts with the component-based framework 820 to support development of administrative tools (not shown). The component-based framework 820 and the administrative tool framework 830 may reside as part of the operating system 805 (as shown) or may reside as part of the program modules 806. The program modules 806 may include one or more components 840 for implementing the present text conversion mechanism as described below. This basic configuration is illustrated in FIG. 8 by those components within dashed line 808.

Computing device 800 may have additional features or functionality. For example, computing device 800 may also include additional data storage devices (removable and/or non-removable) such as, for example, magnetic disks, optical disks, or tape. Such additional storage is illustrated in FIG. 8 by removable storage 809 and non-removable storage 810. Computer storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of device 800. Computing device 800 may also have input device(s) 812 such as keyboard, mouse, pen, voice input device, touch input device, etc. Output device(s) 814 such as a display, speakers, printer, etc. may also be included. These devices are well known in the art and need not be discussed at length here.

Computing device 800 may also contain communication connections 816 that allow the device to communicate with other computing devices 818, such as over a network. Communication connection(s) 816 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media can be any available media that can be accessed by a computer. By way of example, and not limitation, computer readable media may comprise "computer storage media" and "communications media."

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Conclusion

The above-described techniques (e.g., methods, devices, systems, etc.) pertain to fair stateless model checking. Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method of scheduling a stateless model checking analysis, the method comprising:
    creating an exhaustive thread execution schedule that creates a nondeterministic assignment of thread executions for threads of a computer program during a cycle of the computer program, the exhaustive thread execution schedule comprising a first list of thread execution events that includes exhaustive thread execution events for the threads of the computer program during a full execution of the computer program;
    identifying, in the first list of thread execution events, thread execution events that correspond with unfair assignments of one or more of the threads; and
    modifying the first list of thread execution events by replacing the identified thread execution events with alternate thread execution events to create a second list of thread execution events that includes a fair and exhaustive thread execution schedule for the computer program.

2. The method of claim 1, wherein the unfair assignments of threads comprise assignments of threads which are unable to be executed by the computer program.

3. The method of claim 1, wherein the cycle includes a time range that begins with an initiation of the computer program and ends at an occurrence of at least one of a bug detection, a livelock detection, or a natural termination of the computer program.

4. The method of claim 3, wherein the livelock detection comprises determining that the computer program does not make progress after a predetermined number of iterations.

5. The method of claim 1, further comprising outputting the fair and exhaustive thread execution schedule.

6. The method of claim 1, wherein the unfair assignments of threads result in at least one of a thread that engages in a yield, calls a sleep function, or enters a timeout.

7. A method of analyzing a program, the method comprising:
    selecting a multi-thread program that includes cyclic state spaces;
    obtaining a priority graph configured to prioritize threads in the multi-thread program;
    scheduling a first thread of the multi-thread program from an instance of a plurality of schedules, the instance comprising a first list of thread execution events for a full execution of the multi-thread program;
    determining that the first thread is not making progress; and
    in response to determining that the first thread is not making progress, modifying the first list of thread execution events, the modifying comprising selecting a second thread from the priority graph to replace the first thread in the first list of thread execution events to create a second list of thread execution events for the full execution of the multi-thread program, the second thread having a greater priority than at least one other thread in a plurality of threads in the multi-thread program.

8. The method of claim 7, further comprising detecting an occurrence of at least one of a bug, a livelock, or a successful program completion after the instance of the plurality of schedules has completed.

9. The method of claim 8, wherein the livelock is an event that occurs when the multi-thread program is unable to make progress.

10. The method of claim 7, wherein the determining that the first thread is not making progress includes determining that the first thread engages in a yield, calls a sleep function, or enters a timeout.

11. The method of claim 7, wherein the priority graph comprises a relative priority for each thread in the multi-thread program.

12. The method of claim 7, wherein selecting the multi-thread program includes selecting a realistic and unmodified program.

13. One or more computer readable hardware storage devices comprising computer-executable instructions that, when executed by a computer, perform acts comprising:
    scheduling a thread from a plurality of threads in a program using an exhaustive scheduler that includes a plurality of schedules, wherein the plurality of schedules includes a schedule comprising a first list of thread execution events that comprises exhaustive thread execution events for a full execution of the program;
    analyzing the thread to determine that the thread cannot make progress;

in response to determining that the thread cannot make progress, modifying the first list of thread execution events, the modifying comprising scheduling two or more alternate threads of the plurality of threads to replace the thread in the first list of thread execution events to create a second list of thread execution events; and determining an outcome of the program after the two or more alternate threads have been executed by the program.

14. One or more computer readable hardware storage devices as in claim 13, wherein the scheduling the two or more alternate threads includes scheduling the plurality of threads using a fair scheduler that updates a priority order indicated by the exhaustive scheduler.

15. One or more computer readable hardware storage devices as in claim 13, wherein the scheduling of the two or more alternate threads includes selecting an alternate thread from a priority graph, the priority graph including a priority of each of the plurality of threads, the alternate thread having a higher priority than at least one other thread in the plurality of threads.

16. One or more computer readable hardware storage devices as in claim 15, wherein the priority graph is obtained based on relative relationships of the plurality of threads.

17. One or more computer readable hardware storage devices as in claim 13, wherein the analyzing of the thread to determine that the thread cannot make progress comprises determining that the thread is yielding.

18. One or more computer readable hardware storage devices as in claim 13, wherein determining the outcome of the program includes identifying at least one of a bug, a livelock, or a successful program execution.

19. One or more computer readable hardware storage devices as in claim 13, wherein determining that the thread cannot make progress comprises determining that the program does not make progress after a predetermined number of iterations.

20. One or more computer readable hardware storage devices as in claim 13, wherein the determining the outcome of the program comprises detecting a livelock based on a predetermined bound depth for the program being exceeded.

* * * * *